(12) United States Patent
Vetrovec (10) Patent No.: US 7,735,461 B2
(45) Date of Patent: *Jun. 15, 2010

(54) ENGINE COOLING SYSTEM WITH OVERLOAD HANDLING CAPABILITY

(75) Inventor: Jan Vetrovec, Larkspur, CO (US)

(73) Assignee: Aqwest LLC, Larkspur, CO (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/070,472

(22) Filed: Feb. 19, 2008

(65) Prior Publication Data
US 2009/0205590 A1 Aug. 20, 2009

(51) Int. Cl.
*F01P 11/02* (2006.01)
(52) U.S. Cl. .................. 123/41.14; 123/41.01
(58) Field of Classification Search ............ 237/12.3 B; 123/41.01, 41.14, 41.3, 41.31, 142.5 R
See application file for complete search history.

(56) References Cited

U.S. PATENT DOCUMENTS

| | | | |
|---|---|---|---|
| 4,958,766 A | 9/1990 | Toth et al. | |
| 5,121,714 A | 6/1992 | Suza et al. | |
| 5,211,334 A | 5/1993 | Schatz | |
| 5,277,038 A | 1/1994 | Carr | |
| 5,687,706 A * | 11/1997 | Goswami et al. | 126/263.01 |
| 6,138,618 A * | 10/2000 | Genster | 123/41.14 |
| 6,247,522 B1 * | 6/2001 | Kaplan et al. | 165/10 |
| 6,883,470 B2 | 4/2005 | Lee | |
| 6,955,141 B2 | 10/2005 | Santanam et al. | |
| 7,147,071 B2 * | 12/2006 | Gering et al. | 237/12.3 B |

FOREIGN PATENT DOCUMENTS

| | | | |
|---|---|---|---|
| DE | 2749030 A | * | 5/1978 |
| JP | 11023188 A | * | 1/1999 |
| JP | 2001280134 A | * | 10/2001 |
| JP | 2007101030 A | * | 4/2007 |

* cited by examiner

*Primary Examiner*—Noah Kamen (57) ABSTRACT

A cooling system for an internal combustion engine incorporating a heat accumulator to temporarily store heat during peak heat loads. In automotive vehicles, the heat accumulator may store excess heat generated during vehicle acceleration or hill climbing and it may dissipate stored heat during vehicle cruise, deceleration, or engine idle. The heat accumulator contains phase change material with a solid-to-liquid transition temperature higher than the normal operating temperature of the cooling system. The invention enables reducing the size and weight of engine cooling system without compromising its performance. This is particularly important for improving fuel economy and reduction of emission in automotive vehicles. In addition, the invention enables reducing the coolant inventory in the system thereby allowing for faster engine warm-up and reduced emissions of harmful pollutants during a cold engine start. The invention may be also used for thermal management of engine oil, transmission fluid, or hydraulic fluid.

21 Claims, 4 Drawing Sheets

ENGINE COOLING SYSTEM WITH OVERLOAD HANDLING CAPABILITY

FIELD OF THE INVENTION

The present invention generally relates to thermal management of fluid systems for internal combustion engines and more particularly to providing engine fluid systems with capability to handle thermal overloads.

BACKGROUND OF THE INVENTION

An internal combustion engine (ICE) commonly employs a pressurized cooling system with a circulating liquid coolant for cooling the engine. Waste heat is transferred from the ICE to the coolant in a cooling jacket(s) surrounding combustion heated parts of the engine. The heat absorbed by the circulated coolant is generally dissipated by a heat exchanger into the air. This heat exchanger, also known as a "radiator", may also operate with a cooling fan which blows air into the heat exchanger thereby promoting heat transfer from liquid coolant to air.

Scaling Considerations for Engine Cooling Systems: The design capacity of ICE cooling system is traditionally determined according to the cooling capacity needed for the most severe operating conditions of the particular ICE installation such as conditions of high engine output, low vehicle speed, and/or hot ambient temperatures. Heat transfer capacity of the radiator also depends on the temperature of ambient air. In particular, in cool temperatures, the radiator may be capable of transferring substantially more heat to ambient air than in hot ambient conditions. If the engine is used in automotive vehicle, higher speed of the vehicle generates more favorable conditions for increased heat transfer by the radiator. Normally, coolant circulation between the engine and the radiator is controlled by a temperature control valve (such as a thermostatic valve). The temperature control valve regulates the coolant flow so that the coolant temperature is maintained near a predetermined "normal" operating temperature. However, under heavy load and/or during high ambient temperature conditions, the rate at which waste heat is transferred from the engine into the coolant may exceed the capacity of the radiator to transfer such heat to ambient air. As a result, the coolant temperature may rise above the predetermined normal operating temperature. If the heat load is not reduced, coolant temperature may approach the coolant boiling point, a coolant pressure relief valve may open, and substantial loss of coolant from the system may occur.

To prevent frequent thermal overload, the heat load handling capacity of a given-size ICE cooling system may be increased by using one of the two principal approaches: 1) increasing the system's physical size or 2) increasing the system's operating temperature. Increasing the physical size of the cooling system may be accomplished, for example, by increasing the size of the radiator core, capacity of the coolant pump (also known as water pump), capacity of the cooling fan, or some combination of these. In automotive applications, however, space in the engine compartment is becoming very scarce in part due to downsizing of vehicle engine and body motivated by the desire to increase fuel economy and reduce harmful emissions. In particular, downsized engines often require a supercharger and a charge air cooler to attain acceptable acceleration. Such equipment requires significant volume in the engine compartment. In addition, increasing the volume of cooling fluid in the system negatively impacts the warm-up characteristics of the engine, which translates to increased cold start emissions. Furthermore, increasing the capacity of the water pump and/or cooling fan also increases parasitic losses and reduces the overall engine system efficiency.

Increasing the operating temperature of the cooling system is a well-known approach for increasing thermal handling capacity of the system without increasing its physical size. With higher temperature difference between coolant and ambient air at the radiator core, heat dissipation capacity of the radiator is significantly increased. Operating temperature of the cooling system is also related to its operating pressure, which should held at a sufficiently high level to prevent the coolant from boiling. In particular, the operating temperature of many cooling systems for automotive engines in current production is about 100 degrees Centigrade (215 degrees Fahrenheit). In these systems, a pressure relief valve is typically set to open at about 15 psig, which is the vapor pressure of water-based coolant corresponding to a coolant temperature of about 120 degrees Centigrade (248 degrees Fahrenheit). There are, however, several drawbacks to increasing the operating temperature of the cooling system, which include reduced lifetime of cooling system components such as the radiator core, radiator hoses and water pump seals. In addition, increasing the coolant operating pressure may actually have an adverse effect on cooling at certain critical points in the engine, particularly in systems where a significant amount of (liquid-to-vapor) phase-change cooling occurs. For example, the most efficient cooling occurs at an engine cylinder wall when coolant conditions are conducive to nucleate boiling. An increase in the operating pressure of a given system elevates the coolant boiling point and impedes nucleate boiling, thereby decreasing the heat transfer from the cylinder wall to the coolant. This may lead to occurrence of hot spots in the engine which may accelerate component fatigue, cause detonation, and excessive NOx emissions.

It has been estimated that under typical driving conditions an automotive ICE generates only about 30% of available power 90% of the time. In the remaining 10% of the time, such as when accelerating or climbing steep inclines, engine power output is higher than 30% of available power and, in some cases it may approach maximum engine output. However, periods of such high power demand are quite limited in duration.

Phase Change Materials: For the purposes of this invention, a material that changes in heat content upon undergoing a reversible solid-liquid phase transformation is defined as a phase change material (PCM). PCMs, synonymously known as latent thermal energy storage materials, are used for thermal energy storage. The absorption of the necessary quantity of energy by the solid PCM results in melting. The energy absorbed by the PCM to change phase at its characteristic melting temperature is known as the latent heat of fusion. The latent heat of fusion stored in the liquid state is released upon resolidification. Thus the PCM may absorb thermal energy from a body at a higher temperature than the PCM, until the PCM undergoes a reversible melt. A molten PCM may transfer thermal energy to a body at a lower temperature than the PCM and it may thereby undergo a reversible solidification (freeze).

Efficient PCMs have several desirable thermo-chemical properties including high latent heat of fusion, high thermal conductivity, low supercooling, and the ability to cycle thermally from solid to liquid and back to solid many times without degradation. The term "supercooling" refers to a discrepancy between the temperature at which solidification (freezing) initiates and the melting temperature of a given PCM when cooled and heated under quiescent conditions. A significant amount of PCM research is devoted to finding nucleating agents additives that will suppress supercooling. The term "additives" includes, in addition to nucleating agents, precursors of such additives which are non-detrimental to the function of the phase change materials. Considerations for selection of suitable PCMs may also include melting temperature, density, packaging, toxicity and cost.

Thermal Batteries: Proposals have been made to incorporate a thermal battery into a coolant loop of automotive ICE. Such a battery is intended to store heat during normal ICE operation and release it later to warm-up the engine and/or the passenger compartment of a vehicle during a cold engine start. The battery may store heat in latent heat of a PCM which melts as the battery is charged and solidifies as the battery releases heat. PCMs used in such batteries have a melting temperature well below the normal operating temperature of the engine cooling system. Therefore, thermal batteries of this type are not capable of absorbing or releasing latent heat of their PCM at temperatures higher than the normal operating temperature the cooling system. Hence, such batteries cannot provide overload capability to engine cooling systems.

In summary, there is a need for means and methods that would allow an engine coolant system to handle temporary increase in heat load without the need to increase the physical size of the system's components and without the need to increase system's operating temperature. Suitable means should be very compact, lightweight, and inexpensive to manufacture and integrate into ICE systems, especially in automotive vehicles.

SUMMARY OF THE INVENTION

The present invention provides a liquid cooling system for an ICE comprising a heat accumulator which receives and stores heat from the liquid coolant at times when ICE heat load to the system exceeds system's capacity to reject heat to ambient air. The accumulator returns the stored heat back to the coolant when the heat load to the system is within system's capacity to reject heat to ambient air. In automotive vehicles, the heat accumulator may store excess ICE heat generated during vehicle acceleration or hill climbing, and it may dissipate stored heat during reduced heat load conditions such as vehicle cruise, deceleration, or idle. Applicant's co-pending, commonly assigned U.S. patent application Ser. No. 11/715,157 filed on Mar. 7, 2007 entitled "Engine Cooling System with Overload Handling Capability," which is hereby expressly incorporated by reference in its entirety, discloses an engine cooling system using a PCM to temporarily store excess waste heat generated by an ICE.

The heat accumulator in accordance with the subject invention contains PCM in thermal contact with the coolant. The PCM has a solid-to-liquid transition (melting) temperature $T_{melt}$ which is higher than the normal operating temperature $T_0$ of the liquid coolant but lower than the temperature $T_{relief}$ at which a coolant pressure relief valve in the system opens. Because the heat accumulator averages out certain peak heat loads to the cooling system, the system's requirement to transfer heat to ambient air may be reduced so as to handle only an average rather than a peak heat load. As a result, the size and weight of engine cooling system may be substantially reduced. This is particularly important for improving fuel economy and reduction of emission in automotive vehicles. See, for example, "Innovative Engine Cooling Systems Comparison," by N. S. Ap and M. Tarquis, a Technical Paper No. 2005-01-1378 presented at the SAE World Congress in Detroit, Mich., Apr. 11-14, 2005, available from SAE International, Warrendale, Pa. In addition, the invention enables reducing the coolant inventory in the system thereby allowing for faster ICE warm-up and reduced emissions of harmful pollutants during a cold engine start.

In one preferred embodiment, the cooling system comprises an ICE, a radiator (ambient air heat exchanger), heat accumulator, and a water pump. The water pump is arranged to circulate coolant between the ICE, the radiator and the heat accumulator. When the waste heat transferred by the ICE to the coolant system is within the capacity of the radiator to transfer heat to ambient air, the coolant system may use a temperature control valve (which may be thermostatic valve) to maintain the coolant temperature in the vicinity of a predetermined normal operating temperature $T_0$ by regulating the flow of coolant to the radiator. During this time the PCM in the heat accumulator is in a solid state. When the rate at which waste heat transferred by the ICE to the coolant system exceeds the radiator's capacity to transfer waste heat to ambient air, the coolant temperature may rise to above the PCM melting temperature $T_{melt}$. This may be referred to as an "overload" condition. As a result of the elevated coolant temperature, the PCM gradually melts and cools the coolant by removing heat from it. When the engine heat load returns to normal levels, coolant temperature may drop to below the solidification temperature $T_{solid}$ of the PCM. As a result, the PCM transfers heat to the coolant and gradually solidifies. Thus by removing and storing engine waste heat during peak load conditions, the heat accumulator may prevent the coolant temperature from reaching a boiling point and, therefore, may prevent the cooling system pressure relief valve from opening and causing a loss of coolant from the system. As will be shown below, the quantity of PCM required to handle many overload situations is very modest.

In another embodiment of the subject invention, the heat accumulator may be placed in an auxiliary line and arranged to be in a good thermal contact with ambient air. Coolant flow through the auxiliary line and the heat accumulator is controlled by an auxiliary valve. When the engine cooling system operates in the vicinity or below its normal operating temperature $T_0$, the auxiliary valve inhibits the flow of coolant through the heat accumulator. During this state, the temperature of the heat accumulator may be near the temperature of ambient air. When the engine coolant temperature rises significantly above the normal operating temperature $T_0$, the auxiliary valve is arranged to direct at least a portion of the engine coolant flow into the heat accumulator. Heat removed by the accumulator from the coolant may be deposited into the accumulator at its sensible heat and latent heat. When the engine cooling system coolant temperature is appropriately reduced, at least portion of the latent heat may be returned from the accumulator to the coolant. When, in addition, the auxiliary valve starts to inhibits the flow of coolant through the heat accumulator, the accumulator may be further cooled by ambient air. The advantage of this embodiment is that both the sensible heat and the latent heat of the accumulator may be utilized to store excess heat from the coolant, which may allow for a smaller and lighter heat accumulator.

The accumulator may be easily integrated into a wide variety of new ICE cooling systems and retrofitted into may existing systems. In particular, the heat accumulator may be formed as a shell containing encapsulated PCM. If cross-linked polyethylene (PEX) or cross-linked high-density polyethylene (HDPEX) are used as PCM, it may be used without encapsulation. The heat accumulator may be also formed into a coolant transfer line, wherein PEX or HDPEX PCM is provided as an internal liner.

These and other features and advantages of the invention will be more fully understood from the following description of certain specific embodiments of the invention taken together with the accompanying drawings.

Accordingly, it is an object of the present invention to provide an engine cooling system that has an overload handling capability.

It is another object of the present invention to provide an engine cooling system that allows downsizing of automotive engines without restricting their peak performance.

It is yet another object of the present invention to provide an engine cooling system that is simple, compact, lightweight, and inexpensive to manufacture and, therefore, suitable for large volume production.

It is still another object of the present invention to provide an engine cooling system that has a low coolant inventory and thus allows quick warm-up during cold engine start.

It is a further object of the present invention to provide a thermal overload capability for an ICE fluid system.

DETAILED DESCRIPTION OF THE PREFERRED EMBODIMENTS

Selected embodiments of the present invention will now be explained with reference to drawings. It will be apparent to those skilled in the art from this disclosure that the following descriptions of the embodiments of the present invention are merely exemplary in nature and are in no way intended to limit the invention, its application, or uses.

Figure 1:
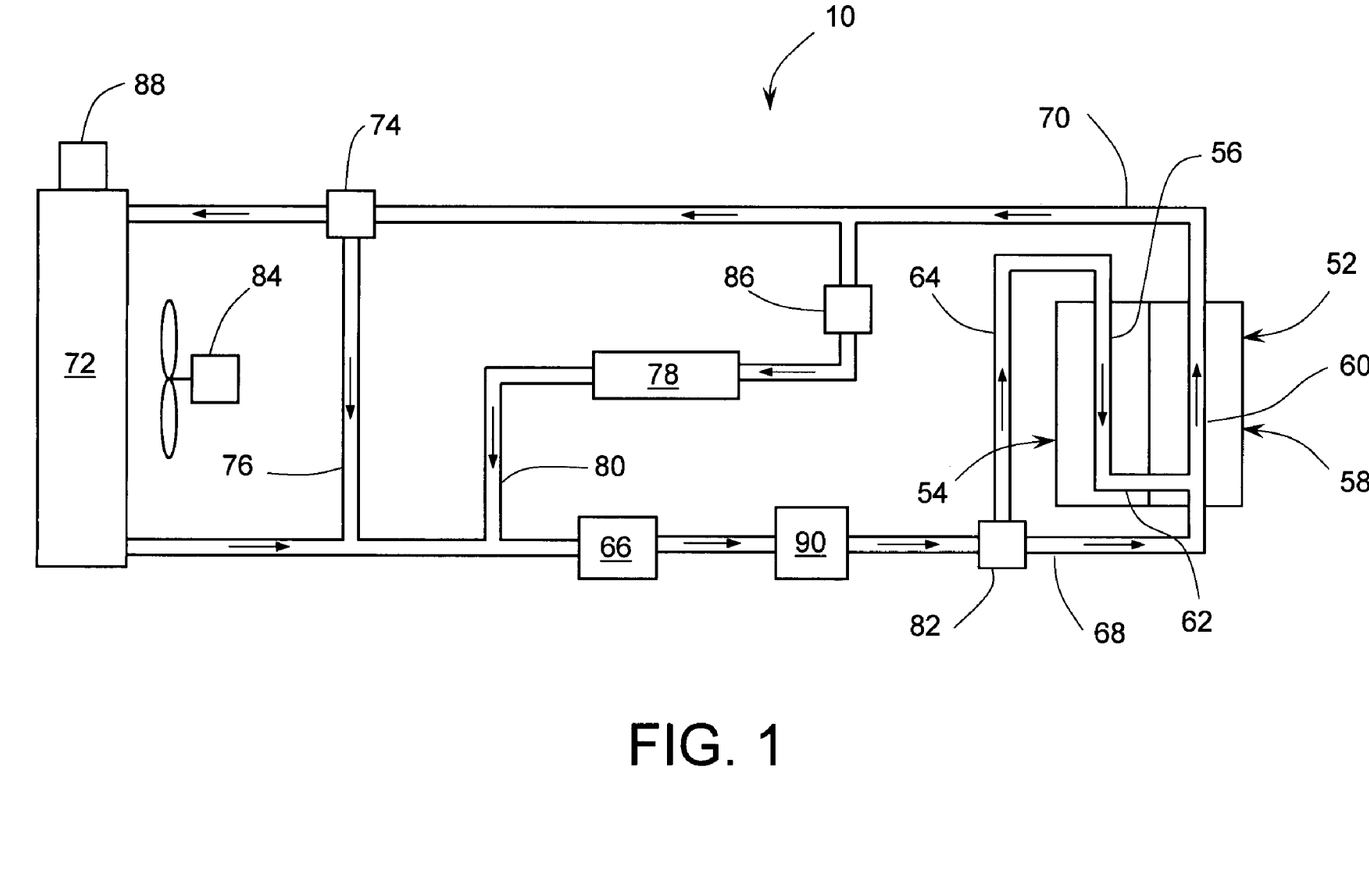
FIG. 1 is a diagrammatic view of an engine cooling system including features according to one preferred embodiment of the present invention.

Referring to FIG. 1 of the drawings in detail, numeral 10 generally indicates a cooling system for an internal combustion engine (ICE). The cooling system 10 generally comprises an engine 52, radiator 72, water pump 66, heat accumulator 90 and interconnecting lines. Components of the cooling system 10 are fluidly connected so that the water pump 66 may circulate liquid coolant between the engine 52 and the radiator 72. Direction of coolant flow is indicated by arrows. The engine 52 may further comprise a cylinder block 54 and a cylinder head 58 mounted on the cylinder block. The cylinder block 54 has a cooling jacket 56 and the cylinder head 58 has a cooling jacket 60. The cooling jackets 56 and 60 are fluidly connected by an internal passage 62 between the head 58 and the block 54. A first coolant inlet line 64 fluidly connects with the cooling jacket 56 of the block 54 to receive coolant from the coolant pump 66. A second coolant inlet line 68 fluidly connects with the cooling jacket 60 of the head 58 and it may receive coolant from the water pump 66.

The water pump 66 may be of any suitable type including a centrifugal type and vane type, and it may be driven either by the engine 52, a hydraulic motor, an electric motor, or by other suitable means. The water pump drive may have a variable speed drive arranged so that the pump output flow rate may be varied to meet coolant flow demand over desirable range. Alternatively to variable speed drive, the water pump 66 may use variable pitch vanes or an engine bypass line to vary coolant flow through the engine.

The cooling system 10 may also include a diverter valve 82 disposed between the coolant pump 66 and the coolant inlet lines 64 and 68 of the engine 52. The diverter valve 82 is adapted to selectively regulate the amount of coolant flow circulated through the block 54 and the head 58. In particular, the diverter valve 82 may direct full coolant flow to the first coolant inlet 64 for passage through both the block 54 and the head 58 in series. The diverter valve 82 may be adjusted to direct a portion of the coolant flow to the second coolant inlet 68. This portion of coolant flow bypasses the cylinder block 54 and passes through the cylinder head 58, mixing with the portion of coolant coming from the block. This maintains full coolant flow through the head 58 but provides reduced flow through the block 54. The diverter valve 82 allows the water pump 66 to operate at a reduced flow rate by selectively directing flow where the engine 52 needs cooling. Thus, as the amount of coolant pumped through the cooling jackets 56 and 60 decreases, the energy required to drive the water pump 66 decreases and efficiency of the cooling system 10 increases. When the diverter valve 82 reduces the flow of coolant to the block 54 and directs the bypassed flow to the head 58, the head may be operated at a cooler temperature than the block 54, which may be more easily maintained at a desired operating temperature. This allows for increased engine efficiency and reduced emissions. Running the head 58 at a lower temperature than the block 54 also reduces the likelihood of knock, and may allow the engine 52 to operate at a higher compression ratio.

The radiator 72 is a heat exchanger adapted for removing excess heat from the coolant heated in the engine 52 and transferring such heat to ambient air. The radiator 72 may receive warmer coolant from the coolant outlet line 70 of the engine 52. Coolant discharged from the radiator 72 is conducted back to the water pump 66 to be circulated through the system 10 for cooling the engine 52. A coolant pressure relief valve 88 may be installed in the system 10, preferably integrated with the radiator 72 and it may be located in proximity of the coolant inlet to the radiator. In particular, the pressure relief valve 88 may be an integral part of a radiator fill cap. The pressure relief valve 88 may be set to open at a pressure corresponding to a coolant temperature $T_{relief}$ which may be near the coolant boiling point. The cooling system 10 may also include a fan 84 to direct ambient air flow through the radiator 72 and thus increase the cooling rate of the coolant passing through the radiator. Suitable fan 84 may have a variable speed drive, or variable pitch blade, and/or a reversible motor to change air speed and flow direction through the radiator 72.

The temperature control valve 74 directs coolant flow either to the radiator 72 or to a radiator bypass line 76 connected to the inlet of the water pump 66. The temperature control valve 74 may operate to selectively bypass a portion or all of the flow of coolant around the radiator 72 when the coolant temperature is below a predetermined normal operating temperature $T_0$. The temperature control valve 74 regulates the amount of coolant flow to the heat exchanger 72 by directing excess coolant flow back to the water pump 66 through a radiator bypass line 76 to avoid overcooling the engine. The temperature control valve 74 may be a thermostatic valve or an actuated valve operated in accordance with detection values of a coolant temperature sensor (not shown). Starting from a cold engine, the temperature control valve 74 functions to restrict coolant flow to the radiator 72 until the engine 52 has heated the coolant to a temperature $T_0$ corresponding to the normal operating temperature of the engine. This allows a cold engine to reach operating temperature more quickly. As the coolant approaches its predetermined normal operating temperature $T_0$, the temperature control valve 74 gradually opens and allows coolant to flow through the radiator 72 to be cooled as needed to maintain the normal operating temperature of the coolant. The coolant that bypasses the radiator 72 flows through the radiator bypass line 76 to the water pump 66 and is circulated through the system. When the engine 52 has reached its operating temperature, the temperature control valve 74 opens to allow coolant to flow through the radiator 72 where heat is transferred from the coolant to ambient air. Coolant that exits the radiator 72 is directed to the water pump 66. Once the temperature control valve 74 has fully opened, the temperature of the coolant, may fluctuate in the vicinity of the normal operating temperature $T_0$. Such fluctuations may be determined by various factors such as the size of the radiator 72, speed of the pump 66, speed of the fan 84, load of the engine 52, and ambient air temperature. Should the coolant temperature fall significantly below the normal operating temperature $T_0$, the temperature control valve 74 will once again restrict coolant flow to the radiator 72 in an effort to restore coolant operating temperature to its normal operating temperature value $T_0$.

The heat accumulator 90 contains a phase change material (PCM) in thermal contact with the liquid coolant inside the cooling system 10. The PCM should have a melting temperature $T_{melt}$ which is higher the normal operating temperature $T_0$ of the coolant. In addition, the PCM melting temperature $T_{melt}$ should be lower than the temperature $T_{relief}$ at which the pressure relief valve 88 opens. This condition may be represented as $T_0 < T_{melt} < T_{relief}$. Preferably, the temperature $T_{melt}$ is at least several degrees Centigrade higher than the temperature $T_0$ and at least several degrees Centigrade lower than the temperature $T_{relief}$. For example, $T_{melt}$ may be at least 5 degrees Centigrade higher than $T_0$. Preferably, $T_{melt}$ is 10 to 20 degrees Centigrade higher than $T_0$. The temperature $T_{solid}$ at which the PCM solidifies should be also higher than the normal operating temperature $T_0$ and it is preferably very close to the melting temperature $T_{melt}$. A low value of $T_{melt} - T_{solid}$ is an indication of low supercooling. Preferably, the temperature $T_{solid}$ is at least several degrees Centigrade higher than the temperature $T_0$. In addition, the PCM used in various embodiments of this invention should have a high heat of fusion and an ability to undergo a large number of thermal cycles without degradation or diminished performance. The PCM should be inexpensive, readily available, non-toxic, non-flammable, non-reactive, and non-corrosive.

Suitable PCM for use with the subject invention include inorganic type and organic type materials. Certain suitable PCM may be found in an article entitled "Review on thermal energy storage with phase change: materials, heat transfer analysis and applications," by B. Zalba et. al, Applied Thermal Engineering, volume 23 (2003), pages 251-283. Suitable inorganic materials may include certain eutectic mixtures of salts, salt hydrites, and metal alloys. Suitable organic materials may include certain organic acids, sugar alcohols, and polymers. A particularly suitable class of organic compounds is disclosed by Lane et al. in U.S. Pat. No. 5,755,988 entitled "Dibasic acid based phase change material compositions," then entire content of which is hereby expressly incorporated by reference. The higher molecular weight dibasic and monobasic acids are characterized by being largely non-hygroscopic and non-corrosive. Mixtures of organic acids have several advantages which make them particularly useful as PCMs. They melt without significant phase segregation, have low or no supercooling, and may be formulated over a broad range of melting temperatures. PCM suitable for use with engine cooling systems having a coolant with a normal operating temperature $T_0$ in the vicinity of 100 degrees Centigrade may include calcium chloride hexahydrate ($MgCl_2.6H_2O$) which has a melting point around 117 degrees Centigrade, eutectic solution E117 which has a melting point around 117 degrees Centigrade, benzoic acid ($C_6H_5COOH$) which has a melting point around 122 degrees Centigrade, and erythritol ($C_4H_{10}O_4$) which has a melting point around 118 degrees Centigrade. E117 is available from EPS Ltd. in Slough, Berkshire, United Kingdom. As already noted above, certain PCM may require addition of additives to reduce their supercooling to acceptable values. Such suitable additives for sugar alcohols (including erythritol) have been disclosed, for example, by Kakiuchi et. al in U.S. Pat. No. 5,785,885.

In some embodiments of the subject invention, the PCM may be a cross-linked polyethylene (PEX) which has a melting point in the range of 110-115 degrees Centigrade, or a cross-linked high-density polyethylene (HDPEX) which has a melting point in the range of 125-146 degrees Centigrade. PEX and HDPEX are known to contain cross-link bonds in the polymer structure, which change these thermoplastic materials into an elastomers. The cross-link bonds permit PEX and HDPEX to undergo a phase change transition (melting) accompanied by its characteristic absorption of heat without turning into liquid. In many applications, this allows PEX and HDPEX PCM to be used without encapsulation in another material. However, when used in aqueous fluid systems containing ferrous components, PEX and HDPEX PCM should have an oxygen barrier between the PCM and the coolant to prevent rusting.

Figure 2:
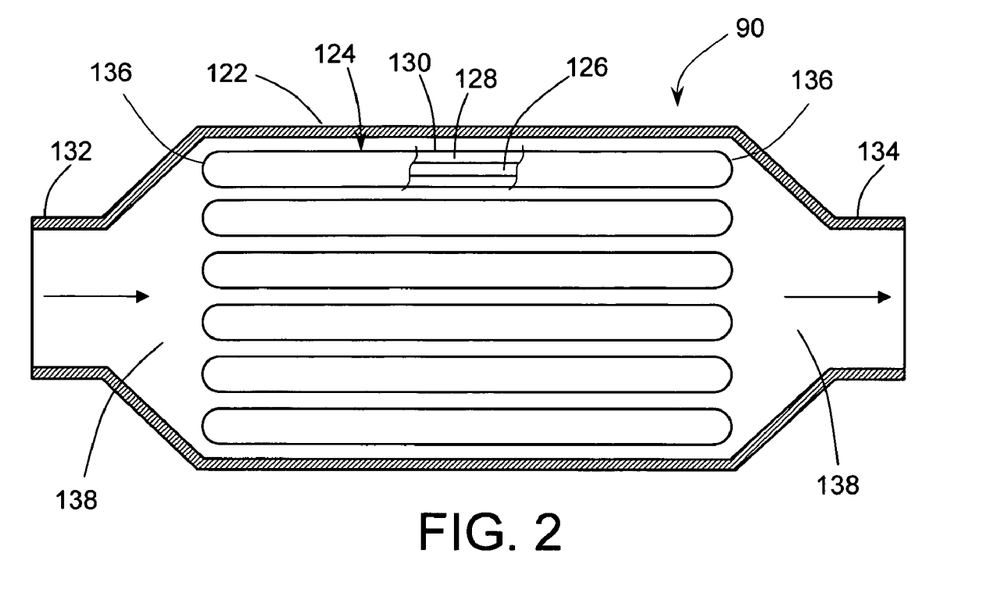
FIG. 2 is a cross-sectional view generally parallel to the coolant flow of a heat accumulator suitable for use with the subject invention.
Figure 3:
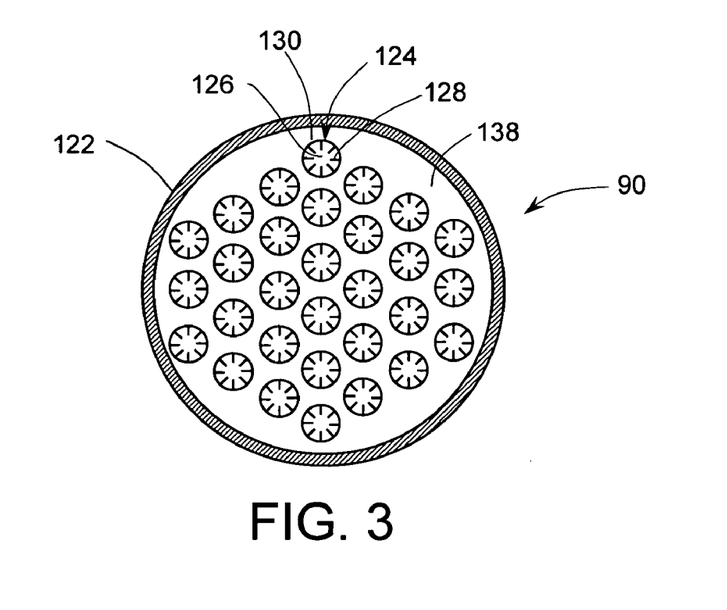
FIG. 3 is a cross-sectional view generally perpendicular to the coolant flow of the heat accumulator shown in FIG. 2.

A configuration of the heat accumulator 90 suitable for use with the subject invention is shown in FIG. 2 and FIG. 3. The heat accumulator 90 generally comprises a plurality of capsules 124 arranged inside a housing 122. The housing 122 has an inlet port 132 and an outlet port 134. Each capsule 124 is completely enclosed and it further comprises a shell 130 filled with PCM 126, and end caps 136. The shell 130 is a generally tubular member preferably made of material having high thermal conductivity. The shell 130 may have internal fins 128 to promote heat transfer between the PCM 126 and the external surface of the shell. Suitable shell may be fabricated, for example, by extruding. The end caps 136 are attached to each end of the shell 130 thereby forming a hermetically sealed package. The end caps 136 may be formed in a domed shape (as shown in FIG. 2) or conical shape or any other shape suitable for reducing resistance to the flow of coolant 138. Liquid coolant 138 may enter the accumulator 90 through the inlet port 132 (FIG. 2), pass through the gaps between the capsules 124 (FIG. 3) while wetting their external surfaces. The coolant may exit the accumulator 90 through the outlet port 134 (FIG. 2). Flow of liquid coolant 138 is indicated by arrows. Capsules 124 may have spacers therebetween to hold them inside the housing 122 and to prevent them from being dislodged by the flow of coolant 138. In a variant of the heat accumulator design, capsules 124 may be arranged generally perpendicular to the coolant flow. In another variant of the heat accumulator design, capsules may have shells with spherical shape or other suitable shape rather than the generally tubular shape shown in FIG. 2. When PCM 126 is PEX or HDPEX, it may be used without the capsules 124, which allows for a simple construction of the heat accumulator 90. However, an oxygen barrier should be used between the PCM 126 and the coolant 138 to prevent possible rusting of ferrous components in the coolant loop. If necessary, un-encapsulated PCM may also include imbedded heat spreading material. Suitable imbedded heat spreading material may include metal and carbon. The heat accumulator 90 may also include a coolant temperature sensor in each the inlet port 132 and the outlet port 134. Detection values from such sensors may be used to determine the heat flow to and from the accumulator and the amount of heat stored therein.

Referring now again to FIG. 1, if the cooling system 10 is used in an automotive vehicle, it may also include a heater core 78 on the outlet side of the engine 52 to provide heat for passenger compartment. A flow control valve 86 may be used to regulate the coolant flow through the heater core. A bypass line 80 directs coolant from the heater core 78 to the water pump 66.

In operation, the water pump 66 circulates liquid coolant through the system 10 between the engine 52 and the radiator 72 and through the heat accumulator 90. The engine 52 transfers waste heat to the liquid coolant flowing through engine coolant passages and the radiator 72 transfers waste heat from the coolant to ambient air. In particular, engine coolant flows from the water pump 66 through the heat accumulator 90 to the diverter valve 82, which controls the diversion of coolant to the cooling jacket 60 of the head 58, which bypasses the cooling jacket 56 of the block 54. The diverter valve 82 may change the relative flow of coolant through the head and the block without changing the speed of the water pump 66. Some of the coolant from the outlet line 70 of the head 58 may be directed to the heater core 78 and the temperature control valve 74. In an automotive vehicle the heater core 78 provides heat for the passenger compartment of an associated vehicle. The bypass line 80 directs coolant from the heater core 78 to the water pump 66. The temperature control valve 74 controls coolant temperature by directing coolant through the radiator 72 or through the radiator bypass line 76, which carries the coolant back to the water pump 66. The coolant directed through the radiator 72 is cooled and directed to the water pump 66. If the system 10 is equipped with a suitable controller, the controller may monitor coolant temperature, fuel flow rate, airflow rate, and engine knock information. Based upon these factors, the controller may determine the appropriate amount of coolant flow through the engine 52 and/or speed of fan 88 to maintain the coolant at its normal operating temperature $T_0$.

When the radiator 72 is capable of transferring waste heat from the coolant to ambient air at the rate that the waste heat is transferred to the coolant by engine 52, the cooling system 10 may operate generally in a steady state and the coolant temperature may not significantly deviate the normal operating temperature $T_0$. In an automotive vehicle, this may correspond to cruising conditions, deceleration, or engine at idle. When, on the other hand, the waste heat load exceeds the heat transfer capacity of the radiator 72, the coolant temperature begins to rise. In an automotive vehicle, this may correspond to a vehicle accelerating or hill-climbing. When, in addition, the temperature of the coolant entering the heat accumulator 90 significantly exceeds the temperature $T_{melt}$, the PCM 126 inside the accumulator 90 may begin to melt, thereby absorbing heat from the coolant. As a result, the temperature of the coolant exiting the accumulator may be lower than the temperature of the coolant entering it. In particular, the temperature of the coolant exiting the accumulator may be only slightly higher than $T_{melt}$. The heat accumulator 90 may continue to remove heat from the coolant until either all of the PCM 126 is substantially melted or the temperature of the coolant entering the accumulator is reduced. The cooling system 10 is preferably designed so that the periods during which the waste heat load from the engine 52 into the coolant exceeds the capacity of the radiator 72 to instantaneously transfer waste heat to ambient air are limited in time. In addition, the amount of PCM in the heat accumulator 90 should be chosen so that excess waste heat from the engine which cannot be transferred by the radiator 72 to ambient air may be temporarily stored in the PCM. Another words, the amount of PCM in heat accumulator 90 should be large enough to absorb peak heat loads that cannot be instantaneously transferred by radiator 72 to ambient air. When the coolant temperature is substantially reduced below the solidification temperature $T_{solid}$ of the PCM, the coolant may remove stored heat from the heat accumulator 90 and the PCM may be gradually solidified. In an automotive vehicle, this condition may correspond to a vehicle at cruising or with an engine at idle.

In some variants of the subject invention, the heat accumulator 90 may be placed in other locations than between the water pump 66 and the engine 52. For example, the heat accumulator 90 may be placed between the radiator 72 and the temperature control valve 74. Alternatively, the heat accumulator 90 may be placed between the radiator 72 and the water pump 66. In some embodiments of the subject invention the heat accumulator 90 may be integrated with the radiator 72. In particular, capsules 124 holding PCM may be installed directly in the radiator 72, for example, inside the manifolds. If the PCM 126 is PEX or HDPEX, it may used in this manner without encapsulation, and it may additionally assume some structural purpose (e.g., radiator manifold dome or portion thereof).

EXAMPLE 1: Consider a hypothetical ICE having a liquid coolant system 10 such as shown in FIG. 1. During operation at normal ICE load the waste heat load from the engine 52 is rejected by the radiator 72 into ambient air. The temperature of the coolant in the system is generally stable and near the normal operating temperature $T_0$. Assume that the demand for ICE output power is increased so that the waste heat load from engine 52 deposited into the liquid coolant exceeds the capacity of radiator 72 to transfer heat to ambient air by 10 kilowatts (kW). In response to such "overload" condition, the coolant temperature may rise to the point when the PCM in the heat accumulator 90 begins to melt, thereby removing heat from the coolant. Assume additionally that after 60 seconds, the demand for ICE output power is returned back to its previous normal condition. The amount of heat deposited in the PCM during the 60 seconds of overload would be about 600 kilojoules (kJ). If the PCM is erythriol ($C_4H_{10}O_4$) which is known to have a heat of fusion about 340 kilojoules per kilogram (kJ/kg), the PCM required to absorb 600 kJ of heat in its latent heat of fusion would weigh only about 1.8 kilograms and would have a volume of only about 1.2 liters. It should be noted that in an automotive vehicle the 60 second overload condition of this example may correspond to climbing a long hill.

FIG. 3 shows a cooling system 11 in accordance with another embodiment of the subject invention. The cooling system 11 is generally similar to the cooling system 10 shown in FIG. 1, except that the heat accumulator 90 is now placed on a auxiliary line 42. The auxiliary line 42 is fluidly connected to a radiator outlet line 92 via an auxiliary valve 44. The auxiliary valve 44 may be configured as a 3-way valve and it may be operated by a thermostat or a remotely controlled actuator. In some variants of the invention, the auxiliary line 42 may be installed downstream of water pump 66 or in other suitable portion of the coolant circuit. When the temperature of the coolant upstream of the auxiliary valve 44 is substantially lower than a predetermined threshold temperature $T_{thresh}$, the auxiliary valve 44 is arranged to inhibit the flow of coolant through the auxiliary line 42. When the temperature of the coolant upstream of the auxiliary valve 44 is substantially higher than the threshold temperature $T_{thresh}$, the auxiliary valve 44 is arranged to divert at least a portion of the coolant flowing in radiator outlet line 92 into the auxiliary line 42 and though the heat accumulator 90. The threshold temperature $T_{thresh}$ is selected to be higher than the normal operating temperature $T_0$. For example, the threshold temperature $T_{thresh}$ may be selected to be at least 5 degrees Centigrade higher than the normal operating temperature $T_0$. Preferably, the threshold temperature $T_{thresh}$ is selected to be lower than the melting temperature $T_{melt}$ of the PCM in the heat accumulator 90. In addition, the threshold temperature $T_{thresh}$ is preferably selected to be lower than the temperature $T_{solid}$ at which the PCM in the heat accumulator 90 solidifies. The accumulator 90 may have external fins attached to the shell 130 to allow for cooling by ambient air.

The cooling system 11 operates similarly to the cooling system 10. When the radiator 72 is capable of transferring waste heat from the coolant to ambient air at the rate that the waste heat is transferred to the coolant by engine 52, the cooling system 11 may operate generally in a steady state and the coolant temperature may not significantly deviate the normal operating temperature $T_0$. In an automotive vehicle, this may correspond to cruising conditions, deceleration, or engine at idle. During this state, the auxiliary valve 44 is arranged to pass all of the coolant flowing through the radiator outlet line 92 directly to the water pump 66 while inhibiting the flow of coolant though the bypass line 42 and the accumulator 90. If the accumulator 90 is be exposed to ambient air, its temperature may be near the ambient air temperature.

When, on the other hand, the waste heat load exceeds the heat transfer capacity of the radiator 72, the coolant temperature may begin to rise. In an automotive vehicle, this may correspond to a vehicle accelerating or hill-climbing. When the coolant temperature rises above the threshold temperature $T_{thresh}$, the auxiliary valve 44 is arranged to direct a substantial portion of the coolant flowing through the radiator outlet line 92 into the auxiliary line 42 and through the accumulator 90. As a result, a substantial portion of the heat in the coolant is transferred to the accumulator 90 and, at least in-part stored therein as sensible heat. When, in addition, the temperature of the coolant entering the heat accumulator 90 significantly exceeds the temperature $T_{melt}$, the PCM 126 inside the accumulator 90 may begin to melt, thereby absorbing additional heat from the coolant. As a result, the temperature of the coolant exiting the accumulator may be lower than the temperature of the coolant entering it. In particular, the temperature of the coolant exiting the accumulator may be only slightly higher than $T_{melt}$. Coolant exiting the heat accumulator 90 is directed to the water pump 66. The heat accumulator 90 may continue to remove heat from the coolant until either all of the PCM 126 is substantially melted or the temperature of the coolant entering the accumulator is reduced.

When the coolant temperature is substantially reduced below the solidification temperature $T_{solid}$ of the PCM, the coolant may remove at least a portion of the heat stored as latent heat from the heat accumulator 90 and the PCM may be gradually solidified. In an automotive vehicle, this condition may correspond to a vehicle at cruising or with an engine at idle. When, in addition, the coolant temperature is substantially reduced below the threshold temperature $T_{thresh}$, the auxiliary valve 44 is again arranged to pass all of the coolant flowing from the radiator 72 directly to the water pump 66 while inhibiting the flow of coolant though the auxiliary line 42 and the accumulator 90. The accumulator 90 may gradually cool down while transferring its sensible heat to ambient air. Because the cooling system 11 may deposit coolant heat into both the sensible heat and the latent heat of the accumulator 90, it may allow for a smaller and lighter accumulator.

Figure 4:
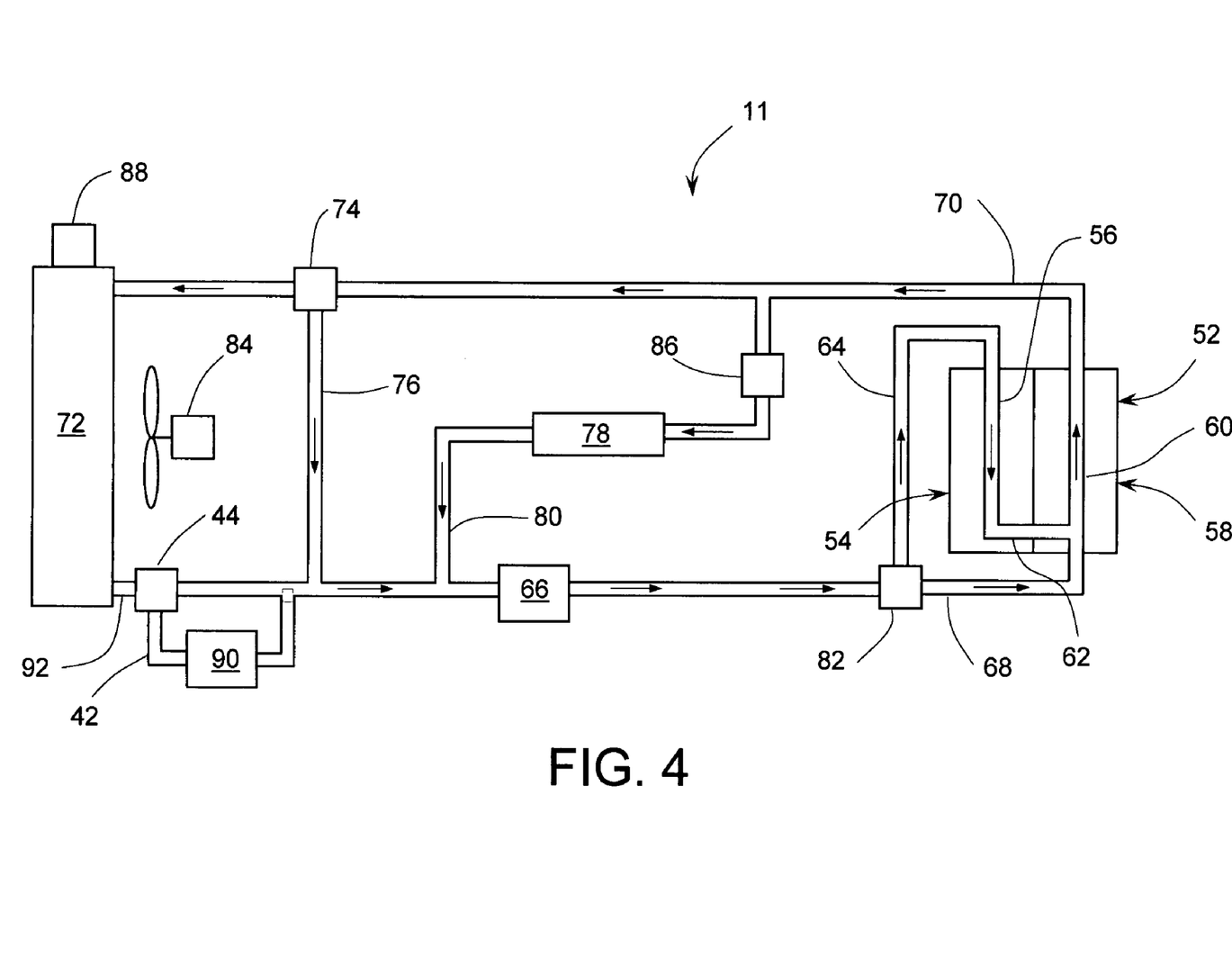
FIG. 4 is a diagrammatic view of an engine cooling system including features according to another preferred embodiment of the present invention.
Figure 5A:
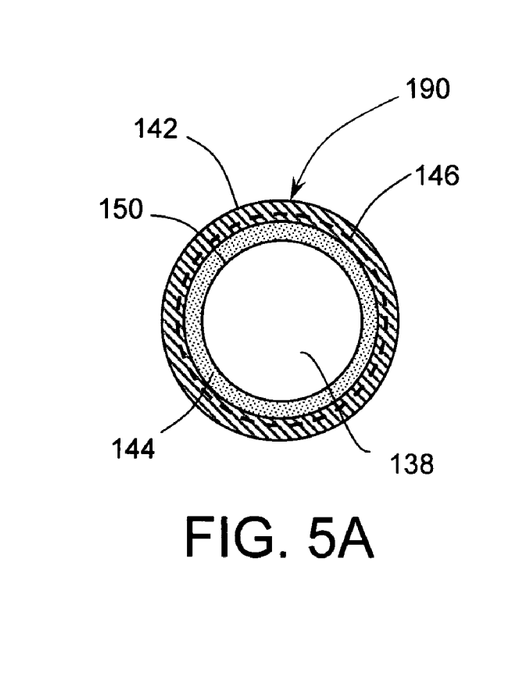
FIG. 5A is a cross-sectional view generally perpendicular to the coolant flow of an alternate heat accumulator formed as a coolant transfer line.
Figure 5B:
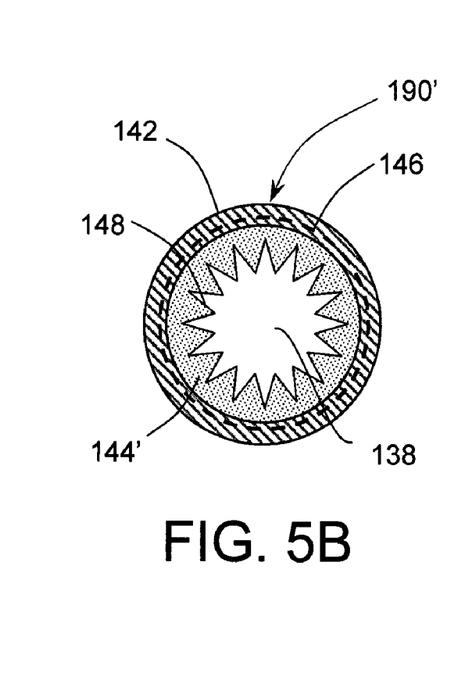
FIG. 5B is a cross-sectional view generally perpendicular to the coolant flow of a variant of an alternate heat accumulator formed as a coolant transfer line.
Figure 5C:
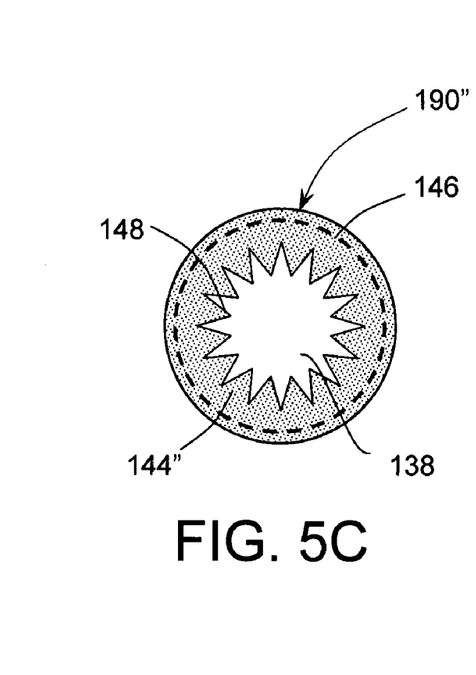
FIG. 5C is a cross-sectional view generally perpendicular to the coolant flow of a another variant of an alternate heat accumulator formed as a coolant transfer line.

FIGS. 5A, 5B, and 5C show cross-sections of heat accumulator variants formed as a coolant transfer lines and suitable for use with the subject invention. In particular, FIG. 5A shows a cross-section of a heat accumulator 190 formed as a coolant transfer line comprising a tubular shell 142 and a liner 144 filled with coolant 138. The tubular shell 142 is preferably made of material having appropriate structural properties to contain the coolant 138 at elevated pressure and temperature and, if required, to provide flexibility. For example, the tubular shell 142 may be made of metal, polymer, or elastomer. In one version of the heat accumulator 190, the tubular shell 142 is formed as bellows made of metal or polymer. In another version of the heat accumulator 190, the tubular shell may be a hose. In yet another version of the heat accumulator 190, the tubular shell may be a rigid conduit. The heat accumulator 190 may also include a reinforcing structure 146, which may be provided in a form of braid made of fibers or metal wires. The reinforcing structure 146 may be imbedded in the material of the tubular shell 142 (as shown in FIG. 4A) or installed over the tubular shell 142. The liner 144 is formed from PEX or HDPEX PCM on the interior of the tubular shell 142 and placed in good thermal contact with the coolant 138. If the associated cooling system includes ferrous components, the liner 144 may comprise an oxygen barrier 150 to prevent rusting.

FIG. 5B shows a cross-section of a heat accumulator 190' formed as a coolant transfer line. The heat accumulator 190' is similar to the heat accumulator 190 except that the liner 144' includes surface extensions 148 to increase the contact area with the coolant 138. FIG. 5C shows a cross-section of a heat accumulator 190" formed as a coolant transfer line. The heat accumulator 190" is similar to the heat accumulator 190' except that the tubular shell 142 (FIG. 5B) is omitted. The liner 144" may provide sufficient containment of the coolant. The liner 144" may also include a reinforcing structure 146, which may be provided in a form of braid made of fibers or metal wires. The reinforcing structure 146 may be imbedded in the liner material (as shown in FIG. 5C) or installed over the liner 144".

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

In some ICE applications it may be beneficial to temporarily stop the radiator fan to allow directing as much power as possible to engine output, as disclosed, for example, by Loes in U.S. Pat. No. 7,134,406. In such situations, the subject invention may be used to prevent the cooling system from overheating. In addition, the use of the subject invention is not limited automotive applications. The subject invention may be used in many ICE systems having liquid cooling systems, for example, utility equipment such as earth movers, ICE-based electric power plants, ICE-based air compressor systems, ICE-powered railway locomotives, ICE-powered cranes and hoists, and ICE-powered pumping plants. Furthermore, the invention may be used to handle thermal overload in engine oil systems, lubricating oil systems, hydraulic fluid systems, and in transmission fluid systems.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

The term "liquid coolant" used in this application should be given an broad interpretation. In some embodiments of the invention, liquid coolant may be essentially a mixture of water and ethylene glycol. In other embodiments of this invention, liquid coolant may be any liquid in an ICE power train (which may include a transmission and/or hydraulic system) that is susceptible to thermal overload. Such a liquid may be an engine oil, lubricating oil, transmission fluid, or hydraulic fluid.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The term "suitable", as used herein, means having characteristics that are sufficient to produce a desired result. Suitability for the intended purpose can be determined by one of ordinary skill in the art using only routine experimentation.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. An engine cooling system for a liquid cooled internal combustion engine; said engine cooling system comprising:
   (a) an engine adapted for transferring waste heat into said liquid coolant;
   (b) a radiator adapted for transferring said waste heat from said liquid coolant to ambient air;
   (c) a water pump arranged to circulate said coolant between said engine and said radiator;
   (d) an auxiliary line with an auxiliary valve for selectively flowing said liquid coolant therethrough; and
   (e) phase change material (PCM) in thermal communication with said liquid coolant in said auxiliary line for transiently absorbing said waste heat from said liquid coolant;
wherein:
   said cooling system is arranged to maintain the temperature of said liquid coolant near a predetermined normal operating temperature $T_0$; and
       said PCM has a melting temperature $T_{melt}$ which is higher than said predetermined normal operating temperature $T_0$.

2. The engine cooling system of claim 1 wherein:
   (a) said engine has a coolant inlet and coolant outlet;
   (b) said radiator has a coolant inlet and coolant outlet; said coolant inlet of said radiator being fluidly connected to said coolant outlet of said engine; and
   (c) said water pump having a suction port and a discharge port; said suction port being fluidly connected to said coolant outlet of said radiator; and said discharge port being fluidly connected to said coolant inlet of said engine.

3. The engine cooling system of claim 1 wherein:
   said auxiliary valve is arranged to inhibit the flow of said liquid coolant through said auxiliary line whenever the temperature of said liquid coolant is substantially less than a predetermined threshold temperature $T_{thresh}$;
   said auxiliary valve is arranged to divert at least a portion of said coolant circulating between said engine and said radiator into said auxiliary line whenever the temperature of said liquid coolant substantially exceeds said predetermined threshold temperature $T_{thresh}$; and
   said predetermined threshold temperature $T_{thresh}$ is selected to be higher than said normal operating temperature $T_0$.

4. The engine cooling system of claim 1 further comprising a temperature control valve to maintain said liquid coolant at said predetermined normal operating temperature $T_0$.

5. The engine cooling system of claim 1 wherein said melting temperature $T_{melt}$ of said PCM is at least 5 degrees Centigrade higher than said predetermined normal operating temperature $T_0$.

6. The engine cooling system of claim 1 wherein said PCM comprises a material selected from the group consisting of salt hydrate, calcium chloride hexahydrate ($MgCl_2.6H_2O$), eutectic solution E117, dibasic acid, benzoic acid ($C_6H_5COOH$), sugar alcohol, erythritol ($C_4H_{10}O_4$), cross-linked polyethylene (PEX), and cross-linked high-density polyethylene (HDPEX).

7. The engine cooling system of claim 1 wherein said auxiliary valve is selected from the group consisting of a 3-way valve, a thermostatic valve, and actuated valve.

8. An automotive vehicle powered by an internal combustion engine, said vehicle comprising:
   (a) an engine generating fluctuating amounts of waste heat; said engine being adapted for transferring said waste heat to a liquid coolant;
   (b) a radiator adapted for transferring average amount of said waste heat from said liquid coolant to ambient air but not the peaks of said fluctuating amount;
   (c) a water pump arranged to circulate said liquid coolant between said engine and said radiator;
   (d) an auxiliary line with an auxiliary valve for selectively flowing said liquid coolant therethrough; and (e) phase change material (PCM) placed in thermal communication with said liquid coolant in said auxiliary line; said PCM arranged to absorb heat from said liquid coolant during said peaks;

wherein:

said cooling system is arranged to maintain the temperature of said liquid coolant near a predetermined normal operating temperature $T_0$; and said PCM has a melting temperature $T_{melt}$ which is higher than said predetermined normal operating temperature $T_0$.

9. The automotive vehicle of claim 8 wherein:
(a) said engine has a coolant inlet and coolant outlet;
(b) said radiator has a coolant inlet and coolant outlet; said coolant inlet of said radiator being fluidly connected to said coolant outlet of said engine;
(c) said water pump having a suction port and a discharge port; said suction port being fluidly connected to said coolant outlet of said radiator; said discharge port being fluidly connected to said coolant inlet of said engine.

10. The automotive vehicle of claim 8 wherein:

said auxiliary valve is arranged to inhibit the flow of said liquid coolant through said auxiliary line whenever the temperature of said liquid coolant is substantially less than a predetermined threshold temperature $T_{thresh}$;

said auxiliary valve is arranged to divert at least a portion of said coolant circulating between said engine and said radiator into said auxiliary line whenever the temperature of said liquid coolant substantially exceeds said predetermined threshold temperature $T_{thresh}$; and said predetermined threshold temperature $T_{thresh}$ is selected to be higher than said normal operating temperature $T_0$.

11. The automotive vehicle of claim 10 wherein said predetermined threshold temperature $T_{thresh}$ is selected to be at least 5 degrees Centigrade higher than said normal operating temperature $T_0$.

12. The automotive vehicle of claim 10 wherein said melting temperature $T_{melt}$ of said PCM is 10 to 20 degrees Centigrade higher than said predetermined normal operating temperature $T_0$.

13. The automotive vehicle of claim 10 wherein said PCM comprises a material selected from the group consisting of salt hydrate, calcium chloride hexahydrate ($MgCl_2.6H_2O$), eutectic solution E117, dibasic acid, benzoic acid ($C_6H_5COOH$), sugar alcohol, erythritol ($C_4H_{10}O_4$), cross-linked polyethylene (PEX), and cross-linked high-density polyethylene (HDPEX).

14. An engine cooling system for a liquid cooled internal combustion engine; said engine cooling system comprising an engine, a radiator, an auxiliary line, an auxiliary valve installed in said auxiliary line, a heat accumulator installed in said auxiliary line, and a water pump; said water pump being arranged to circulate said liquid coolant between said engine and said radiator; said engine cooling system arranged to maintain the temperature of said liquid coolant near a predetermined normal operating temperature $T_0$; said auxiliary valve arranged to control the flow of said liquid coolant through said auxiliary line and through said heat accumulator in accordance with temperature of said coolant; said heat accumulator comprising a phase change material (PCM) having a melting temperature $T_{melt}$ at least 5 degrees Centigrade higher than said normal operating temperature $T_0$; and said PCM being in a thermal contact with said liquid coolant inside said auxiliary line.

15. The engine cooling system of claim 14 wherein said auxiliary line is disposed between a pair of components selected from the group consisting of said water pump and said engine, said engine and said radiator, and said radiator and said water pump; said heat accumulator being fluidly coupled to said pair of components for flowing said liquid coolant therethrough.

16. The engine cooling system of claim 14 wherein:

said auxiliary valve is arranged to substantially inhibit the flow of said liquid coolant through said auxiliary line whenever the temperature of said liquid coolant is substantially less than a predetermined threshold temperature $T_{thresh}$;

said auxiliary valve is arranged to divert substantial portion of said coolant circulating between said engine and said radiator into said auxiliary line whenever the temperature of said liquid coolant substantially exceeds said predetermined threshold temperature $T_{thresh}$; and said predetermined threshold temperature $T_{thresh}$ is selected to be higher than said normal operating temperature $T_0$.

17. The engine cooling system of claim 16 wherein said predetermined threshold temperature $T_{thresh}$ is selected to be at least 5 degrees Centigrade higher than said normal operating temperature $T_0$.

18. The engine cooling system of claim 14 wherein said PCM comprises a material selected from the group consisting of salt hydrate, calcium chloride hexahydrate ($MgCl_2.6H_2O$), eutectic solution E117, dibasic acid, benzoic acid ($C_6H_5COOH$), sugar alcohol, erythritol ($C_4H_{10}O_4$), cross-linked polyethylene (PEX), and cross-linked high-density polyethylene (HDPEX).

19. A method for cooling an internal combustion engine (ICE); said method comprising the acts of:
(a) providing an ICE adapted for being cooled by a liquid coolant;
(b) providing a radiator adapted for transferring heat from said liquid coolant to ambient air;
(c) providing a phase change material (PCM) selected from the group consisting of cross-linked polyethylene (PEX) and cross-linked high-density polyethylene (HDPEX); said PCM being in thermal communication with said liquid coolant;
said PCM having a melting temperature $T_{melt}$ and a solidification temperature $T_{solid}$;
(d) operating said ICE;
(e) circulating said liquid coolant between said ICE and said radiator;
(f) maintaining said liquid coolant at a predetermined operating temperature $T_0$ which is at least 5 degrees Centigrade lower than said melting temperature $T_{melt}$ of said PCM;
(g) increasing the output of said ICE;
(h) allowing the temperature of said liquid coolant to rise above said melting temperature $T_{melt}$ of said PCM;
(i) transferring heat from said liquid coolant to said PCM;
(j) melting at least a portion of said PCM;
(k) reducing the ICE output;
(l) allowing the temperature of said liquid coolant to decrease to a value lower than said solidification temperature $T_{solid}$ of said PCM;
(m) transferring heat from said PCM to said liquid coolant; and
(n) solidifying said PCM.

20. The method of claim 19 wherein said PCM is configured as a part of said radiator.

21. The method of claim 19 wherein said PCM is configured as a part of a coolant transfer line.

* * * * *